United States Patent
Fiacco et al.

(10) Patent No.: US 9,092,258 B2
(45) Date of Patent: Jul. 28, 2015

(54) TASK CONCURRENCY LIMITER

(71) Applicant: Bank of America Corporation, Charlotte, NC (US)

(72) Inventors: Daniel M. Fiacco, Jacksonville, FL (US); Nicholas J. Drewek, Charlotte, NC (US); Dineshkumar Mohan, Jacksonville, FL (US); Senthilkumaran Alaguvel, Jacksonville, FL (US); Senthil Muthuvaithyalingam, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 286 days.

(21) Appl. No.: 13/710,545

(22) Filed: Dec. 11, 2012

(65) Prior Publication Data

US 2014/0165067 A1   Jun. 12, 2014

(51) Int. Cl.
    *G06F 9/455* (2006.01)
    *G06F 9/46* (2006.01)
    *G06F 9/48* (2006.01)

(52) U.S. Cl.
    CPC .................................. *G06F 9/4843* (2013.01)

(58) Field of Classification Search
    None
    See application file for complete search history.

(56) References Cited

U.S. PATENT DOCUMENTS

| | | | |
|---|---|---|---|
| 6,289,382 B1 | 9/2001 | Bowman-Amuah |
| 6,332,163 B1 | 12/2001 | Bowman-Amuah |
| 6,339,832 B1 | 1/2002 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,213 B1 | 12/2002 | Bowman-Amuah |
| 6,529,909 B1 | 3/2003 | Bowman-Amuah |
| 6,529,948 B1 | 3/2003 | Bowman-Amuah |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,601,192 B1 | 7/2003 | Bowman-Amuah |
| 6,601,234 B1 | 7/2003 | Bowman-Amuah |
| 6,606,660 B1 | 8/2003 | Bowman-Amuah |
| 6,615,199 B1 | 9/2003 | Bowman-Amuah |
| 6,615,253 B1 | 9/2003 | Bowman-Amuah |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |

(Continued)

*Primary Examiner* — Lewis A Bullock, Jr.
*Assistant Examiner* — Bruce S Ashley
(74) *Attorney, Agent, or Firm* — Michael A. Springs (57) ABSTRACT

In an exemplary embodiment, a method includes intercepting a first task sent from a task scheduler of a first computing system to a second computing system. A number of active tasks initiated by the task scheduler that are being performed by the second computing system is determined. The sending of the first task to the second computing system is delayed in response to a determination that the number of active tasks being performed by the second computing system is greater than or equal to a predetermined task limit associated with the second computing system. The first task is sent to the second computing system in response to a determination that the number of active tasks being performed by the second computing system is less than the predetermined task limit associated with the second computing system.

15 Claims, 3 Drawing Sheets

(56) References Cited

U.S. PATENT DOCUMENTS

| | | |
|---|---|---|
| 6,640,249 B1 | 10/2003 | Bowman-Amuah |
| 6,715,145 B1 | 3/2004 | Bowman-Amuah |
| 6,742,015 B1 | 5/2004 | Bowman-Amuah |
| 6,842,906 B1 | 1/2005 | Bowman-Amuah |
| 7,003,587 B1 | 2/2006 | Battat et al. |
| 7,020,697 B1 | 3/2006 | Goodman et al. |
| 7,289,964 B1 | 10/2007 | Bowman-Amuah |
| 7,353,514 B1 * | 4/2008 | Camp et al. ............ 718/101 |
| 7,386,586 B1 * | 6/2008 | Headley et al. ........ 709/202 |
| 7,467,198 B2 | 12/2008 | Goodman et al. |
| 7,680,879 B2 | 3/2010 | Battat et al. |
| 2003/0204547 A1 * | 10/2003 | Davis et al. ............ 709/101 |
| 2007/0234363 A1 * | 10/2007 | Ferrandiz ................ 718/101 |
| 2009/0300632 A1 * | 12/2009 | Falcon et al. ............ 718/103 |
| 2013/0219395 A1 * | 8/2013 | Geibel et al. ............ 718/101 |

* cited by examiner

TASK CONCURRENCY LIMITER

TECHNICAL FIELD OF THE INVENTION

This invention relates generally to transaction processing and, more specifically, to a task concurrency limiter used in conjunction with a task scheduler.

BACKGROUND OF THE INVENTION

A task scheduler may facilitate the performance of tasks by various computing systems. For example, a task scheduler may be executed by a central computing system and may initiate tasks executed by a computing system coupled to the central computing system through a network by sending a message instructing the computing system to perform the task. Computing systems coupled to the central computing system may execute a remote agent that communicates with the task scheduler. Each remote agent may receive messages that indicate tasks to be performed from the task scheduler and communicate with the components of the respective computing system to carry out the tasks. The remote agents may also report the status of the tasks to the task scheduler.

SUMMARY OF THE INVENTION

In accordance with the teachings of the present disclosure, disadvantages and problems associated with scheduling tasks may be reduced or eliminated.

According to an exemplary embodiment, a method includes intercepting, by one or more processors, a first task sent from a task scheduler of a first computing system to a second computing system coupled to the first computing system via a network, the first task specifying one or more actions to be performed by the second computing system. The method further includes determining, by the one or more processors, a number of active tasks initiated by the task scheduler that are being performed by the second computing system. The method further includes delaying the sending of the first task to the second computing system in response to a determination that the number of active tasks being performed by the second computing system is greater than or equal to a predetermined task limit associated with the second computing system. The method also includes sending the first task to the second computing system in response to a determination that the number of active tasks being performed by the second computing system is less than the predetermined task limit associated with the second computing system.

Certain embodiments of the invention may provide one or more technical advantages. A technical advantage of one embodiment includes optimizing performance of a computing system by limiting the number of tasks performed simultaneously by the computing system. Another advantage includes allowing an important task to be executed regardless of the number of tasks being performed by the computing system. Another advantage includes executing shell scripts to implement task concurrency limiting functionality for a task scheduler that does not natively include the ability to limit task concurrency.

Certain embodiments of the present disclosure may include none, some, or all of the above technical advantages. One or more other technical advantages may be readily apparent to one skilled in the art in view of the figures, descriptions, and claims of the present disclosure.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Figure 1:
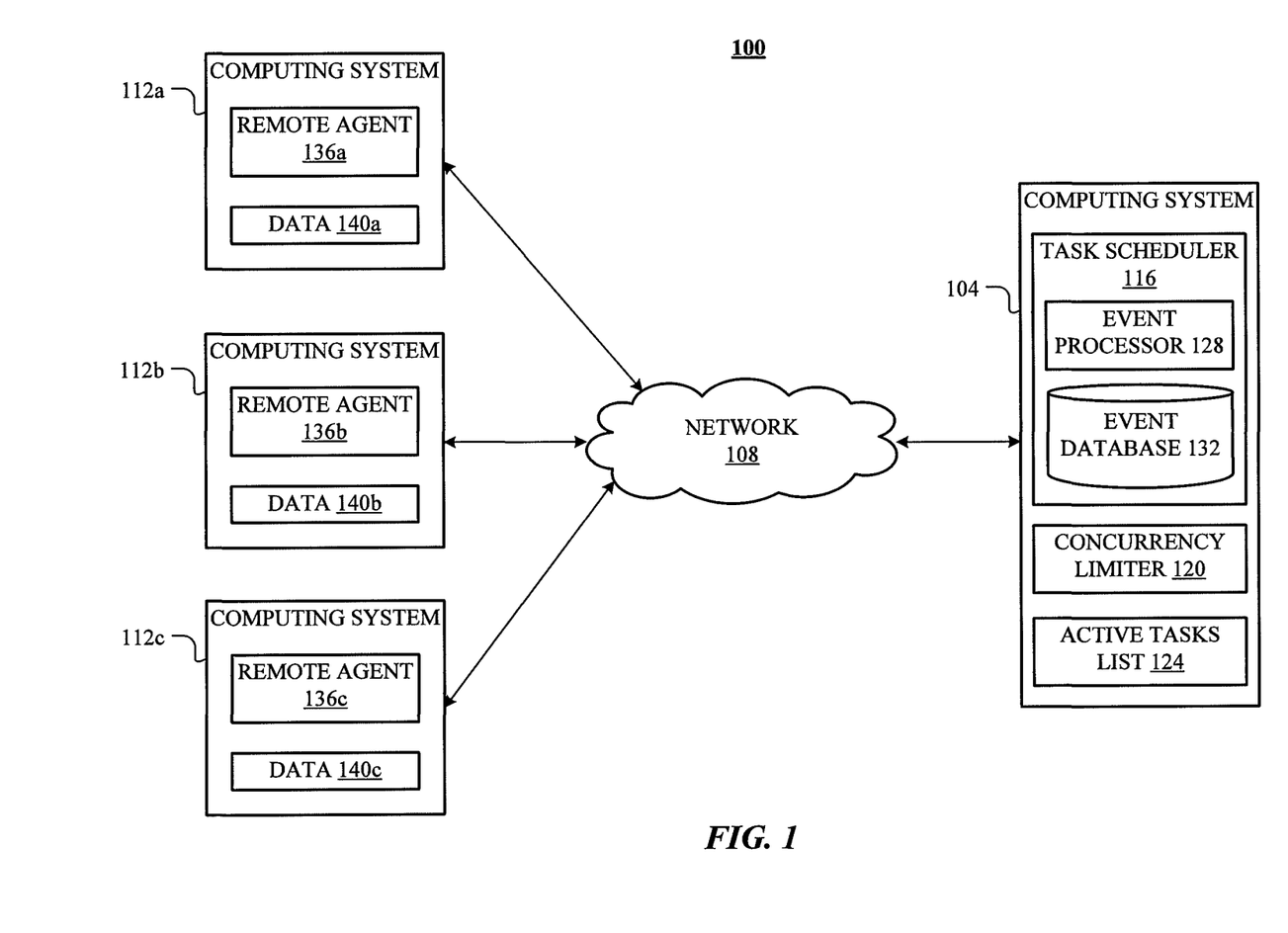
FIG. 1 illustrates an example system that facilitates limitation of the number of concurrent tasks performed by computing systems.
Figure 2:
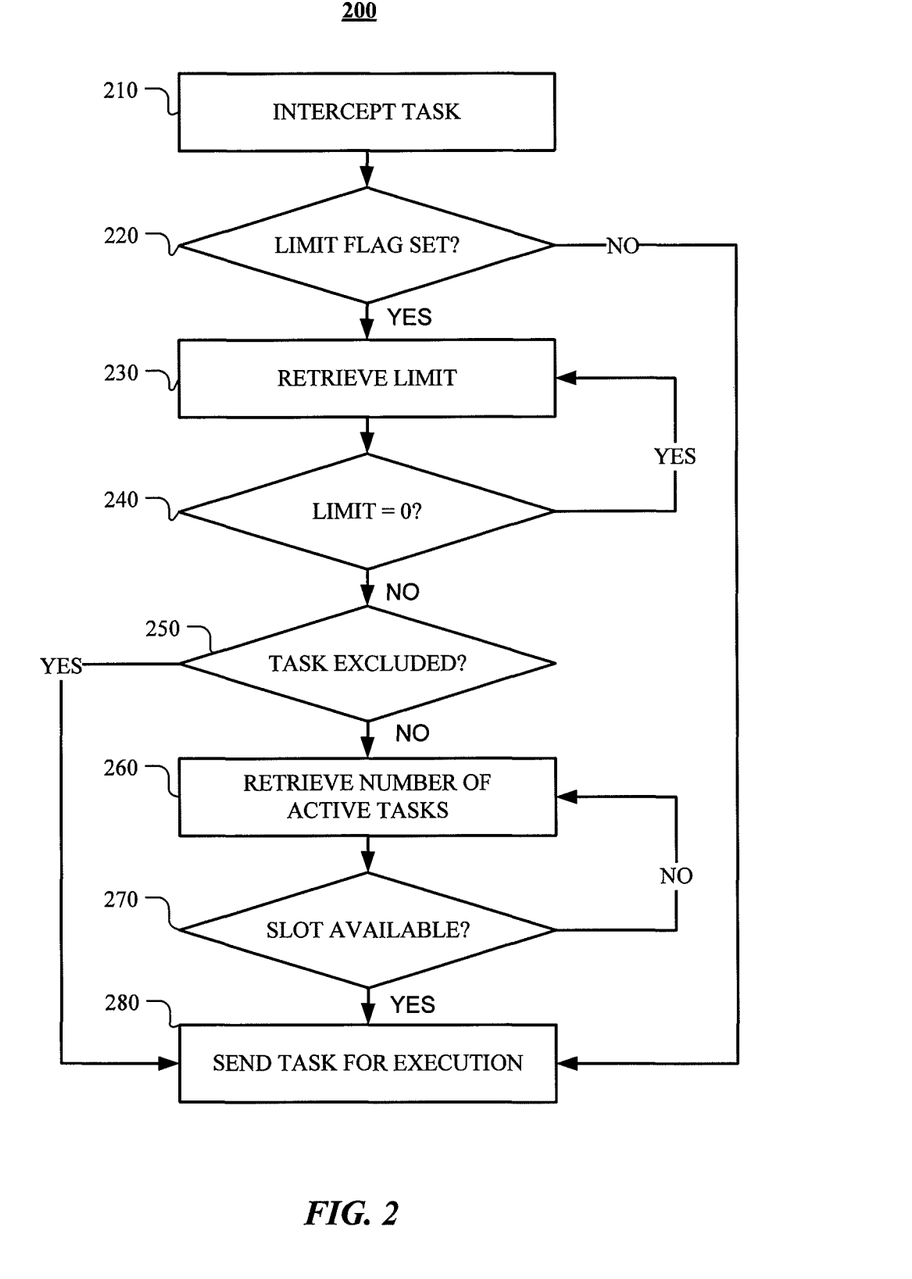
FIG. 2 illustrates an example method for facilitating limitation of the number of concurrent tasks performed by one or more computing systems of FIG. 1.
Figure 3:
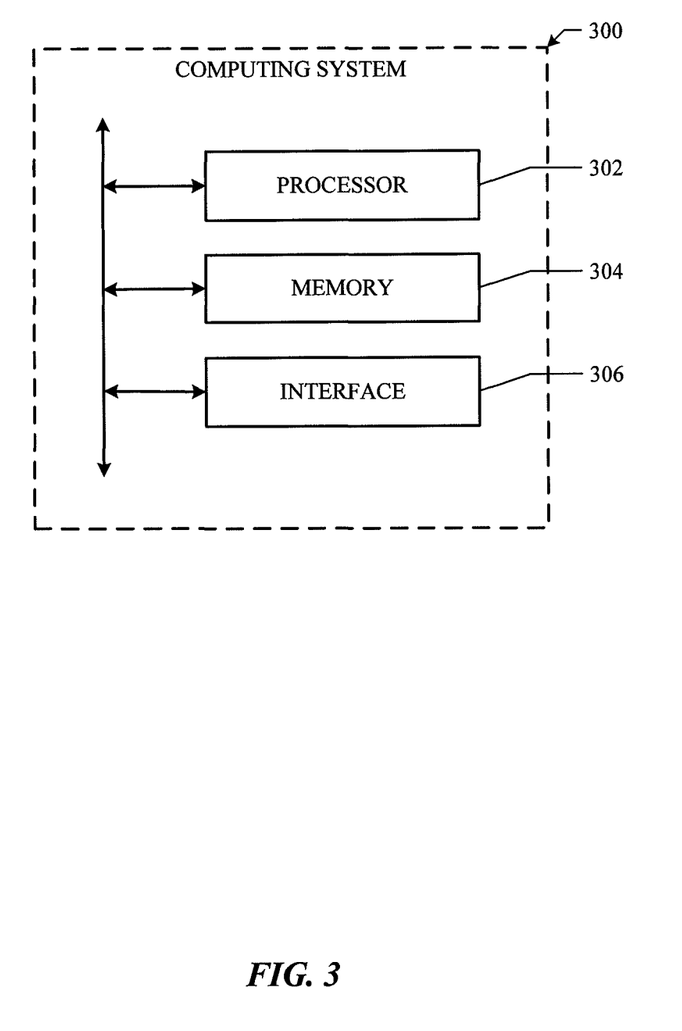
FIG. 3 illustrates example components of the computing systems of FIG. 1.

Embodiments of the present invention and its advantages are best understood by referring to FIGS. 1 through 3, like numerals being used for like and corresponding parts of the various drawings.

FIG. 1 illustrates an example system 100 that facilitates limitation of the number of concurrent tasks performed by computing systems 112. System 100 includes a computing system 104 that communicates over one or more networks 108 with one or more computing systems 112 to facilitate limitation of concurrent tasks performed by each computing system 112. Although a single computing system 104 is depicted, other embodiments may include any suitable number of computing systems 104 that may each or collectively perform the functions of computing system 104 described herein. Computing system 104 includes a task scheduler 116, concurrency limiter 120, and an active tasks list 124. The task scheduler 116 communicates with computing systems 112 via the remote agents 136 of the computing systems 112. For example, task scheduler 116 communicates with computing system 112a via remote agent 136a, with computing system 112b via remote agent 136b, and with computing system 112c via remote agent 136c. Task scheduler 116 may communicate tasks to be performed to computing systems 112. For example, task scheduler 116 may instruct computing system 112a to move a portion of data 140a to computing system 112b. As another example, task scheduler 116 may instruct computing system 112a to move a different portion of data 140a to computing system 112c. Task scheduler 116 may instruct computing systems 112 to perform any suitable tasks.

Task scheduler 116 may communicate any number of tasks to computing systems 112. However, in some embodiments, task scheduler 116 may not include the ability to limit the number of tasks being performed concurrently by each computing system 112. Accordingly, a particular computing system 112a may receive many tasks from task scheduler 116 and attempt to perform all of the tasks simultaneously. However, if too many tasks are run concurrently by computing system 112a, the performance of computing system 112a may degrade or the computing system 112a may fail due to a strain on resources caused by performance of the tasks. Various embodiments of the present disclosure include a concurrency limiter 120 operable to track and limit the number of tasks concurrently performed by each computing system 112. If the number of tasks being concurrently performed by a particular computing system 112a has reached the limit associated with the computing system 112a, then concurrency limiter 120 holds additional tasks to be performed by the computing system 112a in a queue until one or more tasks finish and the number of tasks being performed by computing system 112a drops below the limit. Concurrency limiter 120 may then retrieve one or more tasks from the queue and transmit the retrieved tasks to computing system 112a for execution. System 100 may operate in this manner until all of the tasks are complete. Such embodiments enable task concurrency limitation in a system that utilizes a task scheduler 116 that does not have a native ability to limit task concurrency.

Each computing system 104 may include a network server, a remote server, a mainframe, a host computer, a workstation, a mid-range server, a web server, or any other suitable device operable to communicate with computing systems 112 and process data. In some embodiments, computing system 104 may execute any suitable operating system such as HP-UX, IBM AIX, MS-DOS, PC-DOS, MAC-OS, WINDOWS, UNIX, LINUX, SUN SOLARIS, or any other appropriate operating system, including future operating systems. The functions of computing system 104 may be performed by any suitable combination of one or more servers or other components at one or more locations. In an embodiment where computing system 104 is a server, the server may be a private server, and the server may be a virtual or physical server. The server may include one or more servers at the same or remote locations.

Computing system 104 may execute task scheduler 116. Task scheduler 116 may include any suitable logic for scheduling and managing tasks performed by computing systems 112. Task scheduler 116 may control the performance of any suitable tasks. As used herein, a task may refer to one or more actions communicated to a computing system (e.g., computing system 112a) via task scheduler 116. A task may be distinguished from a general action executed by a computing system 112 that is not performed in response to a communication received from task scheduler 116. A task may be any suitable operation that may be performed by a computing system 112, such as the movement of at least a portion of data 140 to another computing system 112, data backup or recovery operations, data processing, financial account deposit or credit operations, general execution of computer instructions, or other suitable operations. As an example, a series of tasks may comprise a series of data movement jobs between computing systems 112.

In particular embodiments, task scheduler 116 may be a computer program such as AUTOSYS version 4.5, AUTOSYS version 11.3, or other suitable version of AUTOSYS available from CA, WINDOWS TASK SCHEDULER available from MICROSOFT, a CRON-based scheduler available in UNIX or LINUX, or other suitable program. In particular embodiments, the task scheduler 116 does not have the ability to track and limit the number of tasks performed concurrently by a computing system 112 that the task scheduler 116 sends tasks to. Thus, such a task scheduler 116 does not accept input from a user that specifies the maximum amount of tasks that may be performed concurrently by a particular computing system 112 and does not limit the number of concurrent tasks according to an limit stored by task scheduler 116.

Task scheduler 116 may include logic for receiving a plurality (e.g., a batch) of tasks that should be performed and controlling the communication of the tasks to the appropriate computing systems 112. The tasks may be communicated to computing systems 112 at any suitable time. For example, task scheduler 116 may be operable to send a task to the associated computing system 112 immediately after receiving the task. As another example, task scheduler 116 may send a task in response to an event, such as the completion or failure of another task, the arrival of a file, or the arrival of a time specified for the performance of the task.

Event processor 128 interprets events and, based on task information stored in event database 132, initiates actions associated with the tasks. For example, event processor 128 may determine that all prerequisite events for a particular task have occurred and may send the task to the specified computing system 112 via remote agent 136 for performance in response to the determination. Event processor 128 may also determine the status of one or more events, store this information in event database 132, and report this information to a user or other program.

Event database 132 stores information associated with tasks and events. For example, when a user or program specifies a task to be performed, the task is stored by event database 132. The task may include a description of the task to be performed, an indication of the computing system that is to perform the task (e.g., a Media Access Control (MAC) address, Internet Protocol (IP) address, or other suitable identifier), any events that must occur before the task is performed, or other suitable information associated with the task. In particular embodiments, instead of specifying a particular computing system, a task may include a specification of a group of computing systems 112 that may perform the task and the event processor 128 or other component of computing system 104 may select one of the computing systems 112 based on availability or other information. The status of each task may also be stored by event database 132. For example, event database 132 may include information such as whether the task has been sent to the relevant computing system 112, whether the task has begun performance by computing system 112, whether the task is complete, whether there has been an error during performance of the task, or other suitable information.

Tasks for computing devices 112 may be specified in any suitable manner. For example, task scheduler 116 may receive tasks via a web-based or local graphical user interface (GUI) or a command line interface. The task may be entered by a user directly into computing system 104 or via a computing system or other device that is coupled to computing system 104 (e.g., through network 108). As another example, tasks may be stored in a memory of computing system 104 and retrieved at the appropriate time by computing system 104. In a particular embodiment, a computer program may generate a plurality of tasks that are received by task scheduler 116. The GUI or command line interface may also allow management, monitoring, or reporting associated with the tasks. In particular embodiments, task scheduler 116 may allow the user to generate one or more groups of tasks that each include one or more tasks to facilitate management of the tasks.

Concurrency limiter 120, in conjunction with active tasks list 124, enables limitation of the number of tasks performed simultaneously by computing systems 112 that receive tasks from a centralized task scheduler 116 that does not natively support task concurrency limitation. In particular embodiments, concurrency limiter 120 includes logic for tracking and limiting the number of tasks that are performed by each computing system 112 and logic for communicating with task scheduler 116. When a task is to be performed, task scheduler may send the task to the computing system that will perform the task. The task may be intercepted by the concurrency limiter 120 before it arrives at the computing system that will perform the task. The concurrency limiter 120 may determine whether the task is subject to concurrency limitation. If it is not, the concurrency limiter 120 sends the task to the computing system for execution. If the task is subject to concurrency limitation, concurrency limiter 120 may determine which computing system 112 (e.g., computing system 112a) is assigned to perform the task and may determine a limit of tasks that may be performed concurrently by the computing system 112a. The concurrency limiter 120 may then check the active tasks list 124 to determine the number of tasks currently being performed by the computing system 112a. If the number of tasks being performed is equal to or greater than the limit, the task may be placed in a holding queue until the computing system 112a finishes one of its current tasks or the task limit is raised, at which time the task is sent to the computing system 112a for execution.

In particular embodiments, concurrency limiter 120 is implemented by one or more shell scripts executed from a command line interface. The shell scripts may perform the functionality of the concurrency limiter 120. For example, instructions of the shell script may intercept a task sent by the task scheduler 116, determine the computing system 112 that will perform the task, determine whether the relevant computing system 112 is subject to concurrency limitation, determine the limit of tasks that may be executed concurrently by the computing system 112, determine the number of active tasks being executed by computing system 112, send the task to the computing system 112 if a slot for the task is available, and update the number of active tasks being executed by computing system 112 in response to an indication that computing system 112 has completed a task (e.g., concurrency limiter 120 may intercept a message from a remote agent 136 to task scheduler 116 reporting the completion of a task or task scheduler 116 may send a message to concurrency limiter 120 upon completion of a task). The shell script may be written for any suitable shell, such as a C shell, a Korn shell, a Bourne shell, or other suitable shell.

In particular embodiments, the task limits associated with computing systems 112 are dynamically adjustable. That is, any of the limits may be changed while one or more commands of the task scheduler 116 or the concurrency limiter 120 are being executed. In particular embodiments, the limits may be stored in a file that may be modified while the task scheduler 116 and the concurrency limiter 120 are executing.

Network 108 represents any suitable network operable to facilitate communication between the components of system 100, such as computing system 104 and computing systems 112. Network 108 may include any interconnecting system capable of transmitting audio, video, signals, data, messages, or any combination of the preceding. Network 108 may include all or a portion of a public switched telephone network (PSTN), a cellular network, a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Each computing system 112 may include a network server, a remote server, a mainframe, a host computer, a workstation, a mid-range server, a web server, a personal computer, or any other suitable device operable to communicate with other computing systems 112 or computing system 104 and process data. In some embodiments, computing system 112 may execute any suitable operating system such as HP-UX, IBM AIX, MS-DOS, PC-DOS, MAC-OS, WINDOWS, UNIX, LINUX, SUN SOLARIS or any other appropriate operating system, including future operating systems. The functions of computing system 112 may be performed by any suitable combination of one or more servers or other components at one or more locations. In an embodiment where computing system 112 is a server, the server may be a private server, and the server may be a virtual or physical server. The server may include one or more servers at the same or remote locations.

In particular embodiments, one or more computing systems 112 may include a platform that is different from the platform of one or more of the other computing systems 112 or computing system 104. For example, computing system 112a may include a MICROSOFT WINDOWS platform, computing system 112b may include a UNIX platform, and computing system 112c may include a SUN SOLARIS platform. Task scheduler 116 and remote agents 136 may be operable to translate tasks into instructions suitable for the relevant platform.

Each computing system 112 may have one or more identifiers that uniquely identify the computing system 112 to task scheduler 116 and concurrency limiter 120. For example, the identifier may be a MAC address, an IP address, or other suitable identifier. The unique identifiers may be included in the active tasks list 124 along with an indication of the tasks or a count of the tasks that are currently being performed by the computing systems 112 that correspond to each unique identifier.

Remote agent 136 is operable to receive tasks from the task scheduler 116, translate the tasks into instructions compatible with the platform of computing system 112, and submit the instructions to one or more components (e.g., memory or processors) of computing system 112 for performance of the tasks. Remote agent 136 may also be operable to communicate with components of computing system 112 to determine the status of the task and to report the status to task scheduler 116 for storage in event database 132.

In particular embodiments, computing systems 104 and 112 are operated by a common enterprise. The enterprise may represent any individual, business, or organization. One example of an enterprise may include a financial institution. A financial institution may include any business or organization that engages in financial activities, which may include, but are not limited to, banking and investment activities such as maintaining accounts (e.g., transaction accounts, savings accounts, credit accounts, investment accounts, insurance accounts, portfolios, etc.), receiving deposits, crediting accounts, debiting accounts, extending credit to account holders, purchasing securities, providing insurance, and supervising a customer's portfolio. A financial institution may utilize task scheduler 116 and concurrency limiter 120 to manage performance of at least a subset of these operations.

A financial institution may provide a variety of financial products and services. Examples of financial products and services may include, but are not limited to, account services such as maintaining accounts, receiving deposits, crediting accounts, debiting accounts, extending credit, purchasing securities, providing insurance, and portfolio management.

A financial institution may provide financial products and services to customers. For example, a financial institution may maintain an account for a customer. The customer may perform a variety of activities using the account, including contributing funds to the account, withdrawing funds from the account, managing the account, and being responsible or liable for account transactions (e.g., purchases).

Although the description focuses on task concurrency limitation of computing systems 112, task scheduler 116 may also manage tasks that are performed by computing system 104. Thus, concurrency limiter 120 and task scheduler 116 may also limit the number of tasks performed concurrently by computing system 104 using methods similar to those described herein with respect to the limitation of task concurrency of computing systems 112.

In operation, computing system 104 is operable to intercept a first task sent from task scheduler 116 to a computing system 112 coupled to computing system 104 via network 108. Concurrency limiter 120 may determine a number of active tasks being performed by computing system 112 that were initiated by task scheduler 116 (i.e., tasks that were sent from task scheduler 116 to computing system 112). Concurrency limiter may be operable to delay the sending of the first task to computing system 112 in response to a determination that the number of active tasks being performed by computing system 112 is greater than or equal to a predetermined task limit associated with computing system 112. Task scheduler 116 may be operable to send the first task to the computing system 112 in response to a determination that the number of active tasks being performed by the computing system 112 is less than the predetermined task limit associated with computing system 112.

FIG. 2 illustrates an example method 200 for facilitating limitation of the number of concurrent tasks performed by one or more computing systems of FIG. 1. The method begins at step 210, where a task is intercepted. For example, a task to be performed by computing system 112 may be sent from task scheduler 116 to computing system 112. Before the task is delivered to computing system 112, concurrency limiter 120 may intercept the task. At step 220, it is determined whether a limit flag is set. A limit flag may be associated with a particular computing system 112 or with any number of computing systems 112 (e.g., all of the computing systems 112 that execute remote agents 136 for communicating with task schedulers 116). If the limit flag is not global (i.e., does not apply to all computing systems 112), then the computing system 112 that will perform the task is determined before the limit flag is checked. If the limit flag is not set, then the concurrency limiter 120 sends the task to the computing system 112 for execution at step 280. The limit flag allows the concurrency limitation features described herein to be turned on or off for one or more of the computing systems 112.

If the limit flag is set, the task limit is retrieved at step 230. For example, the task limit associated with the computing system 112 that is to perform the task may be retrieved. As another example, the task limit may be a global limit that applies to all computing systems 112. The task limit may be stored in memory of computing system 104 or other suitable location and may be set by a user or computer program in any suitable manner. As described above, the task limit may be changed at any suitable time, including during operation of one or more instructions associated with task scheduler 116 or concurrency limiter 120.

At step 240, it is determined whether the limit is equal to zero. If the limit is set to zero, then system 100 is configured to not allow tasks to be sent to computing system 112 until the limit is changed. Accordingly, the method may periodically iterate through steps 230 and 240 until the limit is changed to a value greater than zero. As another example, the method may pause until a trigger associated with the changing of the limit is activated. In particular embodiments, the task may be placed in a holding queue by the concurrency limiter 120 until the limit is increased.

If the limit is not zero, it is determined whether the task is excluded from concurrency limitation at step 250. This may be determined in any suitable manner. For example, concurrency limiter 120 may access a list of excluded task names and if the name of the task matches one of these names, the task may be excluded from concurrency limitation and may be sent to the computing system 112 for execution at step 280. Tasks may be excluded from concurrency limitation based on any suitable characteristics, such as name, priority, resources required to perform the task, computing systems involved in performing the task (e.g., the target computing system of a data movement operation), or other suitable characteristics.

If the task is not excluded from concurrency limitation, the number of active tasks is retrieved at step 260. For example, concurrency limiter 120 may determine the number of tasks currently being performed by the computing system 112 that will perform the task. This may be determined in any suitable manner. In particular embodiments, concurrency limiter 120 queries an active tasks list 124 that stores an indication of each computing system 112 and the tasks or a count of the tasks currently being performed by each computing system. The active task list 124 may be kept up to date by adding each task (or incrementing the count of tasks) that is sent to computing system 112 at step 238 and eliminating each task (or decrementing the count of tasks) when the task is completed or stopped by computing system 112.

At step 270, it is determined whether a slot is available. For example, concurrency limiter 120 may compare the number of active tasks being performed at the relevant computing system 112 with the limit associated with computing system 112. If the number of active tasks is less than the limit, then at least one slot is available and the task is submitted to the computing system 112 for execution at step 280. If the number of active tasks is equal to or greater than the limit, the task is placed in a holding queue until a slot becomes available. As depicted, the method may periodically check the number of active tasks until a slot is available for the task. Once a slot becomes available, the task is submitted to the computing system 112 for execution at step 280. The remote agent 136 of computing system 112 may then communicate with one or more components of the computing system 112 to begin execution of the task.

After submission of the task to the computing system 112 for execution at step 280, the method ends. Modifications, additions, or omissions may be made to the method. The method may include more, fewer, or other steps. Additionally, steps may be performed in parallel or in any suitable order. In particular embodiments, one or more steps of method 200 may be performed with respect to one task while one or more steps of the method 200 are performed with respect to another task. For example, during the time that a task is held in a holding queue by periodically iterating through steps 260 and 270, another task may be checked to determine if the task is excluded from concurrency limitation and then sent for execution at step 280. As another example, if a slot is unavailable and a task is placed in a holding queue, another task may iterate through one or more steps of method 200 and may be placed in the holding queue behind the first task. As another example, the steps of method 200 may be performed in parallel for tasks that are to be performed by different computing systems 112. Any suitable component of system 100, such as concurrency limiter 120, may perform one or more steps of the method.

FIG. 3 illustrates example components of the computing systems of FIG. 1. Thus, computing system 300 may represent computing system 104, computing system 112, or an additional computing system that may be included in system 100. For example, in a particular embodiment, concurrency limiter 120 may reside on a computing system disposed between computing system 104 and computing systems 112. In the embodiment depicted, computing system 300 includes one or more processors 302, one or more memories 304, and one or more interfaces 306 that collectively facilitate limitation of concurrent tasks performed by computing systems.

Processor 302 communicatively couples to network interface 306 and memory 304 and controls the operation and administration of computing system 300 by processing information received from network interface 306 and memory 304. Processor 302 includes any hardware and/or software that operates to control and process information. For example, processor 302 may execute logic located in memory 304 to enable the functionality of concurrency limiter 120, task scheduler 116, or remote agent 136. Processor 302 may be a programmable logic device, a microcontroller, a microprocessor, any suitable processing device, or any suitable combination of the preceding.

Memory 304 stores, either permanently or temporarily, data, operational software, or other information for processor 302. Memory 304 includes any one or a combination of volatile or non-volatile local or remote devices suitable for storing information. For example, memory 304 may include Random Access Memory (RAM), Read Only Memory (ROM), magnetic storage devices, optical storage devices, or any other suitable information storage device or a combination of these devices. Memory 304 may include logic. Logic generally refers to logic, rules, algorithms, code, tables, and/or other suitable instructions embodied in a computer-readable storage medium for performing the described functions and operations of computing system 300. For example, the logic may include instructions for performing functions of task scheduler 116, concurrency limiter 120, remote agent 136, or for executing tasks. While illustrated as including a particular module, memory 304 may include any suitable information for use in the operation of computing system 300.

Network interface 306 represents any suitable device operable to receive information from network 108, transmit information through network 108, perform processing of information, communicate with other devices, or any combination of the preceding. For example, network interface 306 may receive or send information associated with tasks, such as tasks to be performed by computing systems 112 and the status of these tasks through network 108. Network interface 306 represents any port or connection, real or virtual, including any suitable hardware and/or software, including protocol conversion and data processing capabilities, to communicate through a LAN, WAN, or other communication system that allows computing system 300 to exchange information with other computing systems or other components of system 100.

A component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 100 without departing from the scope of the invention. For example, system 100 may include any number of computing systems 104, networks 108, and computing systems 112. Any suitable logic may perform the functions of system 100 and the components within system 100.

Certain embodiments of the invention may provide one or more technical advantages. A technical advantage of one embodiment includes optimizing performance of a computing system by limiting the number of tasks performed simultaneously by the computing system. Another advantage includes allowing an important task to be executed regardless of the number of tasks being performed by the computing system. Another advantage includes executing shell scripts to implement task concurrency limiting functionality for a task scheduler that does not natively include the ability to limit task concurrency.

Certain embodiments of the present disclosure may include none, some, or all of the above technical advantages. One or more other technical advantages may be readily apparent to one skilled in the art in view of the figures, descriptions, and claims of the present disclosure.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus, comprising:
one or more processors operable to:
intercept, via a shell script executed through a command line interface of the apparatus, a first task sent from a task scheduler, the first task specifying one or more actions to be performed and not specifying a computing system for performing the one or more actions;
select, using the shell script, a first computing system to perform the first task, the first computing system coupled to the apparatus via a network;
determine, using the shell script, whether the first computing system is subject to a first concurrency evaluation;
determine, via the shell script, a number of active tasks initiated by the task scheduler that are being performed by the first computing system;
upon a determination that the first computing system is subject to the first concurrency evaluation, determine, using the shell script, whether the number of active tasks being performed by the first computing system is greater than or equal to a first predetermined task limit;
upon a determination that the number of active tasks being performed by the first computing system is less than the first predetermined task limit associated with the first computing system, facilitate communicating, using the shell script, the first task to the first computing system; and
upon a determination that the number of active tasks is greater than or equal to the first predetermined task limit associated with the first computing system, determine whether the first task is excluded from the first concurrency evaluation;
an interface communicatively coupled to the one or more processors and operable to:
upon a determination that the first task is excluded from the first concurrency evaluation, communicate the first task to the first computing system; and
the one or more processors further operable to:
upon a determination that the first task is not excluded from the first concurrency evaluation, delay, via the shell script, the communication of the first task to the first computing system.

2. The apparatus of claim 1, the processor further operable to:
intercept a second task sent from the task scheduler to the first computing system; and
send the second task to the first computing system in response to a determination that tasks to be performed by the first computing system are to be initiated without checking the number of active tasks being performed by the first computing system.

3. The apparatus of claim 1,
the one or more processors further operable to:
intercept, via the shell, a second task sent from the task scheduler;
select, using the shell script, a second computing system to perform the second task, the second computing system coupled to the apparatus via the network;
determine, using the shell script, whether the second computing system is subject to a second concurrency evaluation;
determine, via the shell script, a number of active tasks initiated by the task scheduler that are being performed by the second computing system;
upon a determination that the second computing system is subject to the second concurrency evaluation, determine, using the shell script, whether the number of active tasks being performed by the second computing system is greater than or equal to a second predetermined task limit;
upon a determination that the number of active tasks being performed by the second computing system is less than the second predetermined task limit associated with the second computing system, facilitate communicating, using the shell script, the second task to the second computing system;
upon a determination that the number of active tasks is greater than or equal to the second predetermined task limit associated with the second computing system, determine whether the second task is excluded from the second concurrency evaluation; and
the interface further operable to:
upon a determination that the second task is excluded from the second concurrency evaluation, communicate the second task to the second computing system; and
the one or more processors further operable to:
upon a determination that the second task is not excluded from the second concurrency evaluation, delay, via the shell script, the communication of the second task to the second computing system.

4. The apparatus of claim 1, wherein the first task is movement of data from the first computing system to a different computing system.

5. The apparatus of claim 1, wherein the one or more processors are further operable to retrieve the first task from a holding queue comprising a plurality of tasks waiting to be performed in response to the determination that the number of active tasks being performed by the first computing system is less than the predetermined task limit associated with the first computing system.

6. A non-transitory computer readable medium comprising logic, the logic, when executed by a processor, operable to:
intercept, via a shell script executed through a command line interface, a first task sent from a task scheduler of a first computing system, the first task specifying one or more actions to be performed and not specifying a computing system for performing the one or more actions;
select, using the shell script, a second computing system to perform the first task, the second computing system coupled to the first computing system via a network;
determine, using the shell script, whether the second computing system is subject to a first concurrency evaluation;
determine, via the shell script, a number of active tasks initiated by the task scheduler that are being performed by the second computing system;
upon a determination that the second computing system is subject to the first concurrency evaluation, determine, using the shell script, whether the number of active tasks being performed by the second computing system is greater than or equal to a first predetermined task limit;
upon a determination that the number of active tasks being performed by the second computing system is less than the first predetermined task limit associated with the second computing system, facilitate communicating, using the shell script, the first task to the second computing system;
upon a determination that the number of active tasks is greater than or equal to the first predetermined task limit associated with the second computing system, determine whether the first task is excluded from the first concurrency evaluation;
upon a determination that the first task is excluded from the first concurrency evaluation, communicate, using an interface, the first task to the second computing system;
upon a determination that the first task is not excluded from the first concurrency evaluation, delay, via the shell script, the communication of the first task to the second computing system.

7. The computer readable medium of claim 6, the logic further operable to:
intercept a second task sent from the task scheduler to the second computing system; and
send the second task to the second computing system in response to a determination that tasks to be performed by the second computing system are to be initiated without checking the number of active tasks being performed by the second computing system.

8. The computer readable medium of claim 6, the logic further operable to:
intercept, via the shell script, a second task sent from a task scheduler of a second computing system, the second task specifying one or more actions to be performed and not specifying a computing system for performing the one or more actions;
select, using the shell script, a third computing system to perform the second task, the third computing system coupled to the second computing system via the network;
determine, using the shell script, whether the third computing system is subject to a second concurrency evaluation;
determine, via the shell script, a number of active tasks initiated by the task scheduler that are being performed by the third computing system;
upon a determination that the third computing system is subject to the second concurrency evaluation, determine, using the shell script, whether the number of active tasks being performed by the third computing system is greater than or equal to a second predetermined task limit;
upon a determination that the number of active tasks being performed by the third computing system is less than the second predetermined task limit associated with the third computing system, facilitate communicating, using the shell script, the second task to the third computing system;
upon a determination that the number of active tasks is greater than or equal to the second predetermined task limit associated with the third computing system, determine whether the second task is excluded from the second concurrency evaluation;

upon a determination that the second task is excluded from the second concurrency evaluation, communicate, using the interface, the second task to the third computing system;

upon a determination that the second task is not excluded from the second concurrency evaluation, delay, via the shell script, the communication of the second task to the third computing system.

9. The computer readable medium of claim 6, wherein the first task is movement of data from the second computing system to a different computing system.

10. The computer readable medium of claim 6, the logic further operable to retrieve the first task from a holding queue comprising a plurality of tasks waiting to be performed in response to the determination that the number of active tasks being performed by the second computing system is less than the predetermined task limit associated with the second computing system.

11. A method comprising:

intercepting, by one or more processors using a shell script executed through a command line interface, a first task sent from a task scheduler of a first computing system, the first task specifying one or more actions to be performed and not specifying a computing system for performing the one or more actions;

selecting, by the one or more processors using the shell script, a second computing system to perform the first task, the second computing system coupled to the first computing system via a network;

determining, by one or more processors using the shell script, whether the second computing system is subject to a first concurrency limitation;

determining, by the one or more processors using the shell script, a number of active tasks initiated by the task scheduler that are being performed by the second computing system;

upon a determination that the second computing system is subject to the first concurrency evaluation, determining, by the one or more processors using the shell script, whether the number of active tasks being performed by the second computing system is greater than or equal to a first predetermined task limit;

upon a determination that the number of active tasks being performed by the second computing system is less than the first predetermined task limit associated with the second computing system, communicating, by an interface via the shell script, the first task to the second computing system;

upon a determination that the number of active tasks is greater than or equal to the first predetermined task limit associated with the second computing system, determining, by the one or more processors using the shell script, whether the first task is excluded from the first concurrency evaluation;

upon a determination that the first task is excluded from the first concurrency evaluation, communicating, using the interface, the first task to the second computing system;

upon a determination that the first task is not excluded from the first concurrency evaluation, delaying, via the shell script, the communication of the first task to the second computing system.

12. The method of claim 11, further comprising:

intercepting, by the one or more processors, a second task sent from the task scheduler to the second computing system; and sending the second task to the second computing system in response to a determination that tasks to be performed by the second computing system are to be initiated without checking the number of active tasks being performed by the second computing system.

13. The method of claim 11, further comprising:

intercepting, by one or more processors using the shell script, a second task sent from a task scheduler of a second computing system, the second task specifying one or more actions to be performed and not specifying a computing system for performing the one or more actions;

selecting, by the one or more processors using the shell script, a third computing system to perform the second task, the third computing system coupled to the second computing system via the network;

determining, by the one or more processors using the shell script, whether the third computing system is subject to a second concurrency limitation;

determining, by the one or more processors using the shell script, a number of active tasks initiated by the task scheduler that are being performed by the third computing system;

upon a determination that the third computing system is subject to the second concurrency evaluation, determining, by the one or more processors using the shell script, whether the number of active tasks being performed by the third computing system is greater than or equal to a second predetermined task limit;

upon a determination that the number of active tasks being performed by the third computing system is less than the second predetermined task limit associated with the third computing system, communicating by an interface via the shell script, the second task to the third computing system;

upon a determination that the number of active tasks is greater than or equal to the second predetermined task limit associated with the third computing system, determining, by the one or more processors using the shell script, whether the second task is excluded from the second concurrency evaluation;

upon a determination that the second task is excluded from the second concurrency evaluation, communicating, by an interface, the second task to the third computing system;

upon a determination that the second task is not excluded from the second concurrency evaluation, delaying, via the shell script, the communication of the second task to the third computing system.

14. The method of claim 11, wherein the first task is movement of data from the second computing system to a different computing system.

15. The method of claim 11, further comprising retrieving the first task from a holding queue comprising a plurality of tasks waiting to be performed in response to the determination that the number of active tasks being performed by the second computing system is less than the predetermined task limit associated with the second computing system.

* * * * *